United States Patent [19]

Heffernan

[11] Patent Number: 5,090,050
[45] Date of Patent: Feb. 18, 1992

[54] METHOD AND APPARATUS FOR COMMUNICATING WITH RADIO TELEPHONES

[75] Inventor: Stuart D. Heffernan, Marietta, Ga.

[73] Assignee: Contel Cellular Inc., Atlanta, Ga.

[21] Appl. No.: 693,054

[22] Filed: Apr. 30, 1991

Related U.S. Application Data

[63] Continuation of Ser. No. 407,346, Sep. 14, 1989, abandoned.

[51] Int. Cl.[5] .............................................. H04Q 7/04
[52] U.S. Cl. ...................................... 379/60; 379/58; 379/59
[58] Field of Search ..................... 379/57, 58, 59, 61, 379/60

[56] References Cited

U.S. PATENT DOCUMENTS

| | | | |
|---|---|---|---|
| 4,112,257 | 9/1978 | Frost . | |
| 4,178,476 | 12/1979 | Frost . | |
| 4,187,398 | 2/1980 | Stark . | |
| 4,233,473 | 11/1980 | Frost . | |
| 4,398,063 | 8/1988 | Hass . | |
| 4,644,351 | 2/1987 | Zabarsky | 340/825.44 |
| 4,658,416 | 4/1987 | Tanaka | 379/51 |
| 4,670,905 | 6/1987 | Sandvos et al. . | |
| 4,700,374 | 10/1987 | Bini . | |
| 4,737,978 | 4/1988 | Burke . | |
| 4,748,655 | 5/1988 | Thrower et al. | 370/60 |
| 4,775,999 | 10/1988 | Williams . | |
| 4,796,291 | 1/1989 | Marino | 379/58 |
| 4,833,701 | 5/1989 | Comroe et al. | 379/60 |
| 4,843,622 | 6/1989 | Yotsutani et al. | 379/59 |
| 4,852,148 | 7/1989 | Shibata et al. | 379/59 |

FOREIGN PATENT DOCUMENTS 0034635 3/1983 Japan ..................................... 379/61

*Primary Examiner*—James L. Dwyer
*Assistant Examiner*—M. Shehata
*Attorney, Agent, or Firm*—Lerner, David, Littenberg, Krumholz & Mentlik

[57] ABSTRACT

A radio telephone communication system is provided for communicating with radio telephones associated with a radio telephone system when the radio telephones are operating in a remote geographical area served by another radio telephone system. The radio telephone user transmits by telephone a signal which causes an activation signal to be entered into the data base of a computer associated with the home system. This activation signal identifies the radio telephone and the remote radio telephone system covering the area in which the radio telephone will be located temporarily. Upon receipt of a telephone call for the radio telephone, the data base is searched for the activation signal, and the call is directed to the remote system through a land line telephone connection to the roamer access port of the remote system. The telephone call then is completed through radio communication between the remote system and the radio telephone.

37 Claims, 5 Drawing Sheets

METHOD AND APPARATUS FOR COMMUNICATING WITH RADIO TELEPHONES

This is a continuation of application Ser. No. 07/407,346, filed Sept. 14, 1989, now abandoned.

BACKGROUND OF THE INVENTION

The present invention relates to radio telephone communication systems and more particularly to a method and apparatus for communicating with radio telephones when operating in a remote geographical area.

Radio or cellular telephone service is characterized by a central site transmitting through a number of distributed transmitters to a number of assigned mobile or portable radio telephones within a limited geographical area. A problem with this service is that radio telephones operating outside of the area of their assigned system (the "home system") cannot be reached through radio communication from the central site for the completion of calls. This problem has been remedied in some cases by the operators of adjacent radio telephone systems cooperating to connect their systems into a network to provide automatic radio communication coverage to radio telephones of either system throughout their combined areas of geographical coverage. Within such networks, a radio telephone operating outside of the geographical area of the home system (a "roamer"), but within the geographical area of a remote system with which the home system has combined to form a network, receives calls automatically through the remote system and communication between the home and remote systems. There is no need for the user to be aware that he or she has ventured outside the geographical area of the home system because calls are received and completed in the same manner at all locations within the network.

Briefly, in such networked systems, a call is completed to a roamer by first paging the roamer from the home system within its geographical area. If no response is received, the home system then automatically communicates with the other systems with which it is networked and requests that they conduct similar paging activity for the mobile unit within their geographical areas. If the mobile unit responds to a page from one of these other systems, the telephone call then is completed to the unit through radio communication between the unit and this other system and a telephone connection between that system and the home system.

The roamer also can be reached through a telephone port in the remote system, known as the "roamer access port," through which the remote system can be called directly. In such a system, a caller dials the telephone number assigned to the roamer access port and establishes telephone communication with the remote system. The caller then dials the ten digit telephone number assigned to the mobile u it. The remote system pages the unit, and, if the unit responds, the remote system completes the call through radio communication with the unit and through the telephone connection with the caller through the roamer access port.

Unfortunately, networking of adjacent radio telephone systems generally is feasible only if the cellular telephone equipment comprising the remote radio telephone system is made by the same manufacturer as that of the home system. At present, no standard protocol or specification exists in the cellular telephone equipment industry for networking, and, as a result, no major manufacturer's equipment is configured to automatically network with the equipment of any other major manufacturer. Thus, although virtually every principal geographical market is provided with radio telephone service, networking is not consistent.

Also, although the roamer could be called by calling the remote system directly through its roamer access port, the caller often does not know that the mobile unit has left the home system and, even if this fact is known, the caller may not know the identity of the remote system through which the mobile unit can be reached. Thus, a user of a mobile telephone has no assurance of receiving calls when he or she is in an area not served by the home system.

SUMMARY OF THE INVENTION

The present invention addresses these problems and provides a practical, economical alternative to networking radio telephone systems. The invention provides a method and apparatus for completing calls to roamers operating within the geographical area of a remote system.

In one aspect, the present invention comprises a method and apparatus for completing telephone calls to a roamer in which an activation signal is first entered into the data base of a computer associated with the home system. This signal identifies the roamer and a remote radio telephone system. Upon receipt of a telephone call for the roamer by the home system, the data base is searched for the signal, and the call is directed to the remote system identified from the signal through a telephone connection to the roamer access port of the remote system. The telephone call then is completed through radio communication between the remote system and the mobile unit.

Preferably, before searching the data base, the home system pages the radio telephone in the normal manner within its geographical area and, only if no response is received, searches the data base for an activation signal for the radio telephone. The entering of the activation signal desirably is effected through a coded signal sent by the user of the radio telephone to the home system using DTMF telephone signals. Preferably, the user can transmit the coded signal to the home system either before or after leaving the home system and using either radio or land line telephone communication with the home system. If the user already is operating in the remote system, the call can be routed to the home system through the remote system. Also, if the remote system is configured to automatically register the presence of a roamer and transmit a signal automatically to other cellular systems, including the home system, which identifies the roamer and its presence within the geographical area covered by the remote system, this signal can be used to automatically enter an activation signal for the mobile unit.

When the user no longer desires telephone calls to his or her mobile unit to be directed to the remote system, he or she preferably can cancel the activation signal, or enter a new activation signal for another remote system, using similar telephone communication with the home system. If desired, the user can direct the home system to direct calls for the mobile unit to any other telephone station. If desired, the same apparatus can be used by the remote system to enable its subscribers to have their calls directed to the home system, or any other remote system, upon receipt of an activation signal from these subscribers.

The present invention has the advantage of providing completion of a telephone call to a roamer in an area served by a remote, non-networked system without the requirement for special interfacing or interconnection of the two systems. The only interconnection necessary is a telephone connection to the roamer access port of the remote system.

DETAILED DESCRIPTION OF THE PREFERRED EMBODIMENTS

Figure 1:
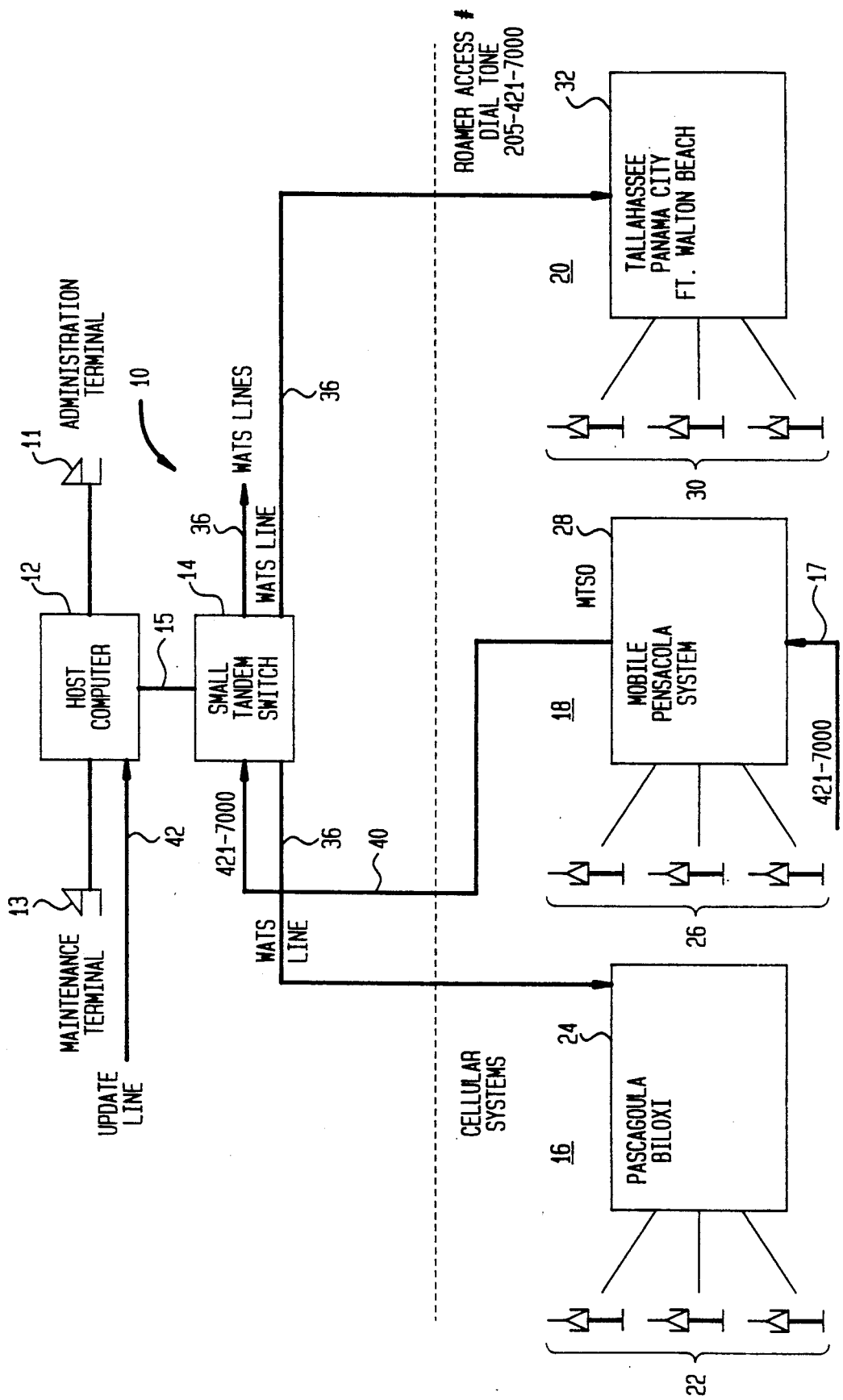
FIG. 1 is a schematic block diagram of three cellular radio telephone systems and a customer locating system associated with one of these systems in accordance with the present invention.

A radio or cellular telephone communication system providing radio telephone service to several separate geographical areas in accordance with the present invention is shown schematically in FIG. 1. This system includes three independently operated, non-networked cellular systems providing radio telephone communication service to several areas within, for example, the southeastern United States. For purposes of illustration, cellular systems 16, 18 and 20 may be considered as providing radio telephone service to the Pascagoula/Biloxi, Mobile/Pensacola, and Tallahassee/Panama City/Ft. Walton Beach geographical areas, respectively. Each of these systems includes a mobile telephone communications switching office (MTSO) 24, 28 and 32, respectively, which is in radio telephone communication, through associated fixed transmitters (not shown), with a number of associated mobile or portable radio telephones 22, 26 and 30, respectively. Each MTSO controls the fixed transmitters associated with its cellular system in order to maintain radio communication with the radio telephones associated with the system throughout the geographical area covered by the system. Radio communication between each MTSO and its associated radio telephones is restricted to this limited geographical area. Incoming calls for mobile units 26 associated with cellular system 18 are made through a land line telephone connection 17 into MTSO 28. Similar land line telephone connections (not shown) into MTSO 16 and MTSO 20 are provided for completing calls to the mobile units associated with these systems.

The cellular telephone equipment used in cellular systems 16, 18 and 20 is supplied by different manufacturers. The equipment of each of these manufacturers is not configured to connect with the equipment of either of the other manufacturers to form a network providing automatic radio telephone coverage to all of the associated radio telephones of each system throughout the systems' combined areas of geographical coverage. Therefore, cellular systems 16, 18 and 20 are not interconnected to form such a network.

Figure 2:
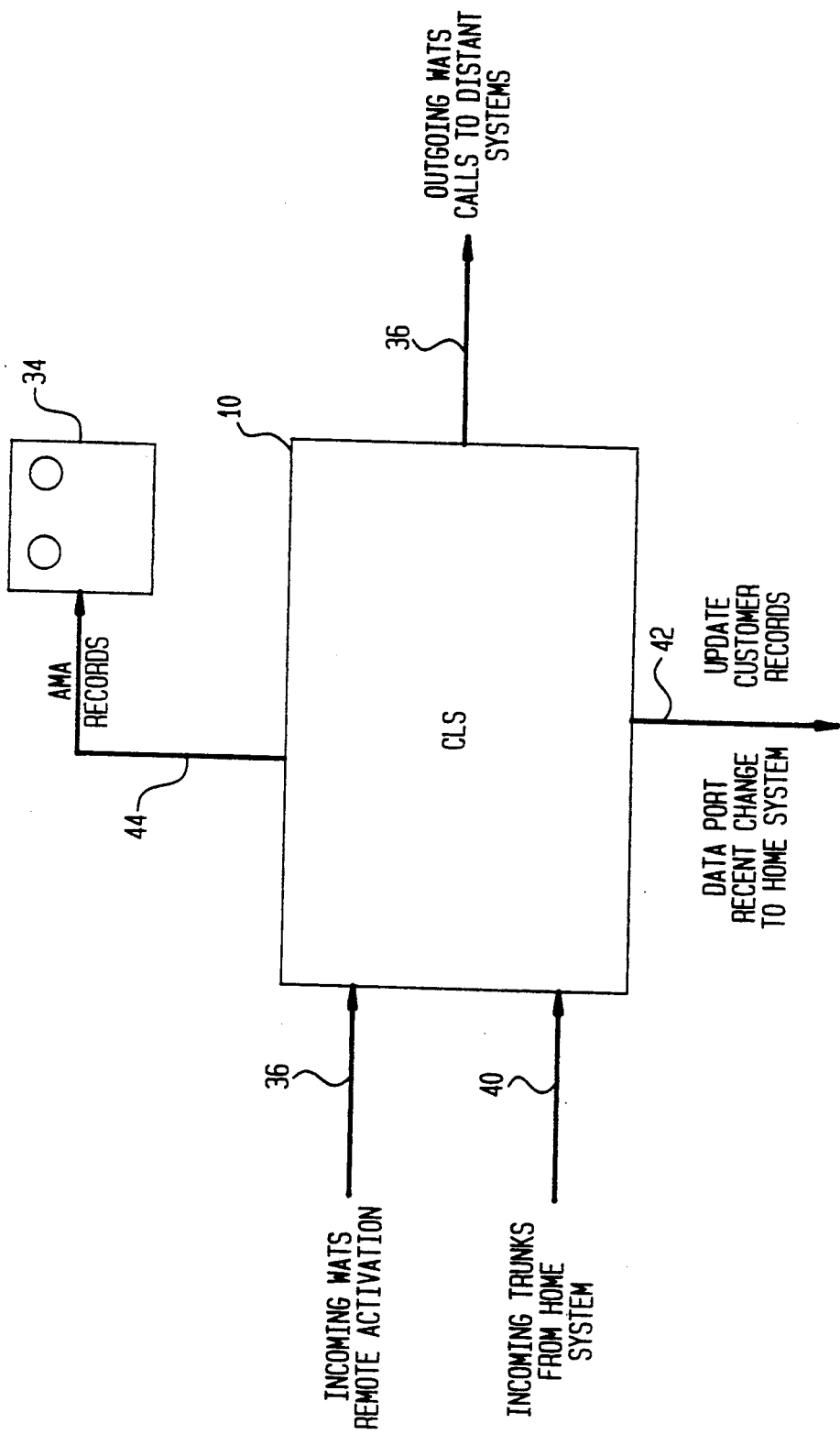
FIG. 2 is a schematic block diagram of the customer locating system shown in FIG. 1 and a message accounting data storage device interactive with this system.

A customer locator system (CLS) 10, shown in FIGS. 1 and 2, is associated with cellular system 18, the "home system." CLS 10 comprises a host computer 12 which is interactive with a small tandem telephone switch 14 through a high speed data link 15. Computer 12 and tandem switch 14 can be incorporated into one unit as illustrated in FIG. 2. An automatic message accounting (AMA) data storage device 34 is associated with CLS 10 through data link 44 to store record keeping and accounting of calls placed through CLS 10. This record keeping and accounting is performed by the host computer but also can be performed by a separate computer dedicated to this function. The host computer 12 is connected to an administration terminal 11 and maintenance terminal 13 for providing maintenance and administration of records such as customer file updates and other data base changes. Access to the host computer for this purpose is through maintenance and update port 42. Telephone communication between the tandem switch 14 and the MTSO 28 of cellular system 18 is provided by trunk transmission line 40, and telephone communication between tandem switch 14 and MTSO 24 and MTSO 32 of cellular systems 16 and 20 (the "remote systems"), respectively, is provided by WATS lines 36 to the "roamer access" telephone ports of these MTSO's. WATS lines 36 can be replaced with any telephone lines providing access to the national telephone network or, if warranted by the extent of traffic between the tandem switch and these other cellular systems, with direct trunk cables.

In operation, a user of one of the mobile units 26, associated with the home cellular system 18, in, or planning to enter, an area served by remote cellular system 16 or 20 calls MTSO 28 of cellular system 18 and, using DTMF signals, sends a coded signal to MTSO 28 which identifies the mobile unit and the remote area that it has entered, or is about to enter. This call can be made from the mobile unit itself, while still within the coverage area of cellular system 18, or from any land line telephone connected to MTSO 28 through land line telephone connection 17. The coded signal is transferred from MTSO 28 to tandem switch 14 of CLS 10 through trunk 40 and causes a corresponding signal to be transmitted to host computer 12 through high speed data link 15. Host computer 12 enters an activation signal for the user into its data base, and a signal indicating that an activation signal has been entered for the user also is entered into the data files of MTSO 28. If the mobile unit already is operating within an area served by cellular system 16 or 20, the call can be made from the mobile unit to tandem switch 14 through WATS lines 36 by patching the call through cellular system 16 or 20.

If the remote system is configured to automatically register the presence of a roamer and to transmit a signal automatically to other cellular systems, including the home system, which identifies the roamer and its presence within the geographical area covered by the remote system, this signal can be directed to tandem switch 14 over other telephone connections (not shown) and a corresponding signal transmitted to host computer 12 to cause host computer 12 to automatically enter an activation signal for the mobile unit. Upon receipt of such signal, host computer 12 can be programmed to enter an activation signal identifying the remote system or any pre-designated telephone station to which tandem switch 14 should direct the user's calls.

When an incoming call is received by MTSO 28 of cellular system 18 for a mobile unit 26 for which an activation signal is on file in host computer 12, MTSO 28 first attempts to complete the call by paging the mobile unit in the normal manner within the area that it serves. If the mobile unit does not respond, MTSO 28 searches its files for a signal, corresponding to an activation signal, for the called mobile unit and, if such a signal is on file, directs the call to tandem switch 14. Tandem switch 14 transmits a corresponding signal over high speed data link 15 to host computer 12 which identifies the mobile unit and cause host computer 12 to search its data base for an activation signal for the mobile unit. If desired, the initial paging step can be omitted and the call directed immediately to tandem switch 14 and host computer 12. If an activation signal is on file, host computer 12 directs tandem switch 14 to dial (using DTMF), over WATS lines 36, the "roamer access" port of the remote cellular system, either cellular system 16 or 20, servicing the area identified from the activation signal. After receiving a dial tone from the remote system, host computer 12 directs tandem switch 14 to transmit in DTMF format the ten digit telephone number assigned to the mobile unit. Cellular system 16 or 18 then pages this unit and, if a response is received, the call is completed over WATS line 36 through cellular system 16 or 20 in the same manner as for other mobile units within the remote system's area. CLS 10, therefore, automatically completes the call to the unit using the same access port and DTMF signals used by a caller dialing the remote system directly to establish telephone communication with the unit. Of course, in order to establish communication, such a caller would have to know that the unit was not operating within the area covered by the home system, the identity of the remote system in which the remote system was operating and the telephone number for the remote system's roamer access port.

Whenever the user no longer desires telephone calls to the mobile unit to be directed to remote systems 16 or 20, he or she can cancel the activation signal by communicating with CLS 10 through a telephone call, from the mobile unit or a land line connection, in the same manner as for entering the activation signal. If desired, after cancellation, a new activation signal identifying a different remote area can be entered. Also, by using differently coded activation signals, host computer 12 can be directed to direct tandem switch 14 to call other telephone stations where the user can be reached or messages can be left. Also, if desired, additional telephone connections can be established between remote cellular systems 16 and 20 to enable CLS 10 to perform the same function for the mobile telephones associated with these systems, mobile units 22 and 30, respectively, when these units are operating in geographical areas remote for their systems. Also, if the remote system is configured to automatically register the presence or departure of a roamer and to transmit a signal automatically to other cellular systems indicating that the roamer has left the geographical area covered by the remote system, this signal can be used, in a manner analogous to that described for entering an activation signal, to cancel the activation signal for the roamer.

Figure 3:
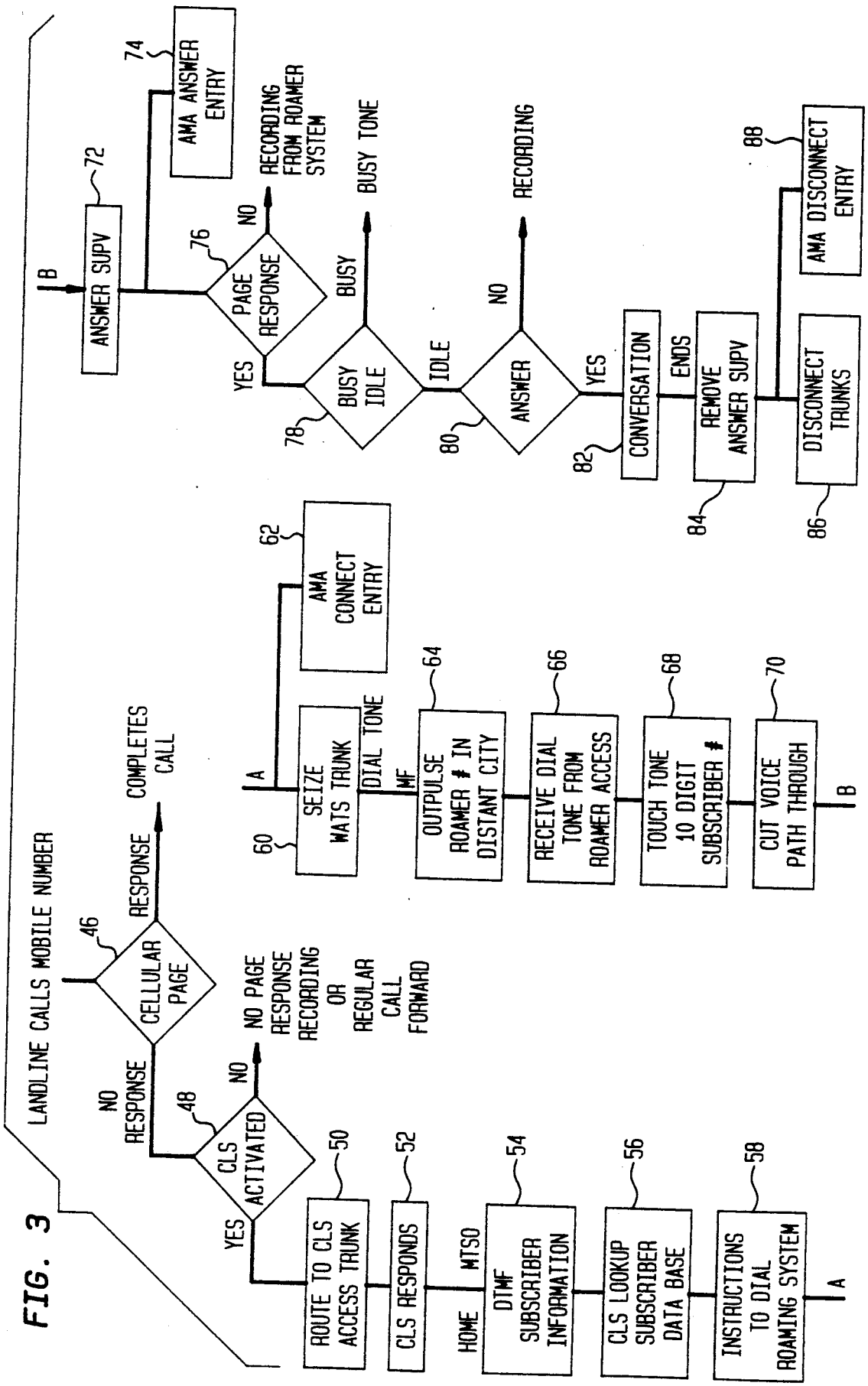
FIG. 3 is a flow diagram of the steps executed in completing a call to a mobile unit in accordance with the present invention.
Figure 4:
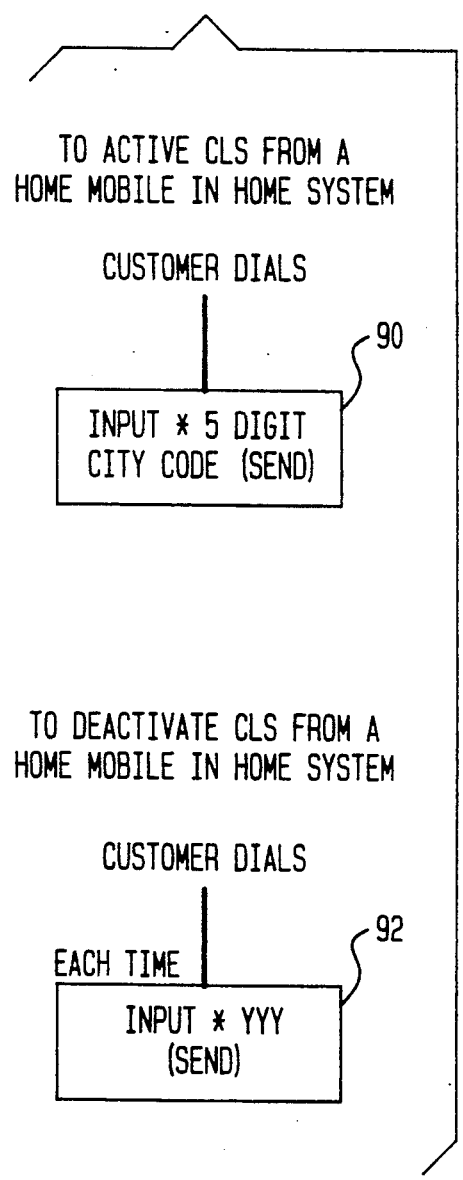
FIG. 4 is a diagram of the steps executed by a user to enter or cancel an activation signal for the customer locating system shown in FIGS. 1 and 2 while operating within the home system.
Figure 5:
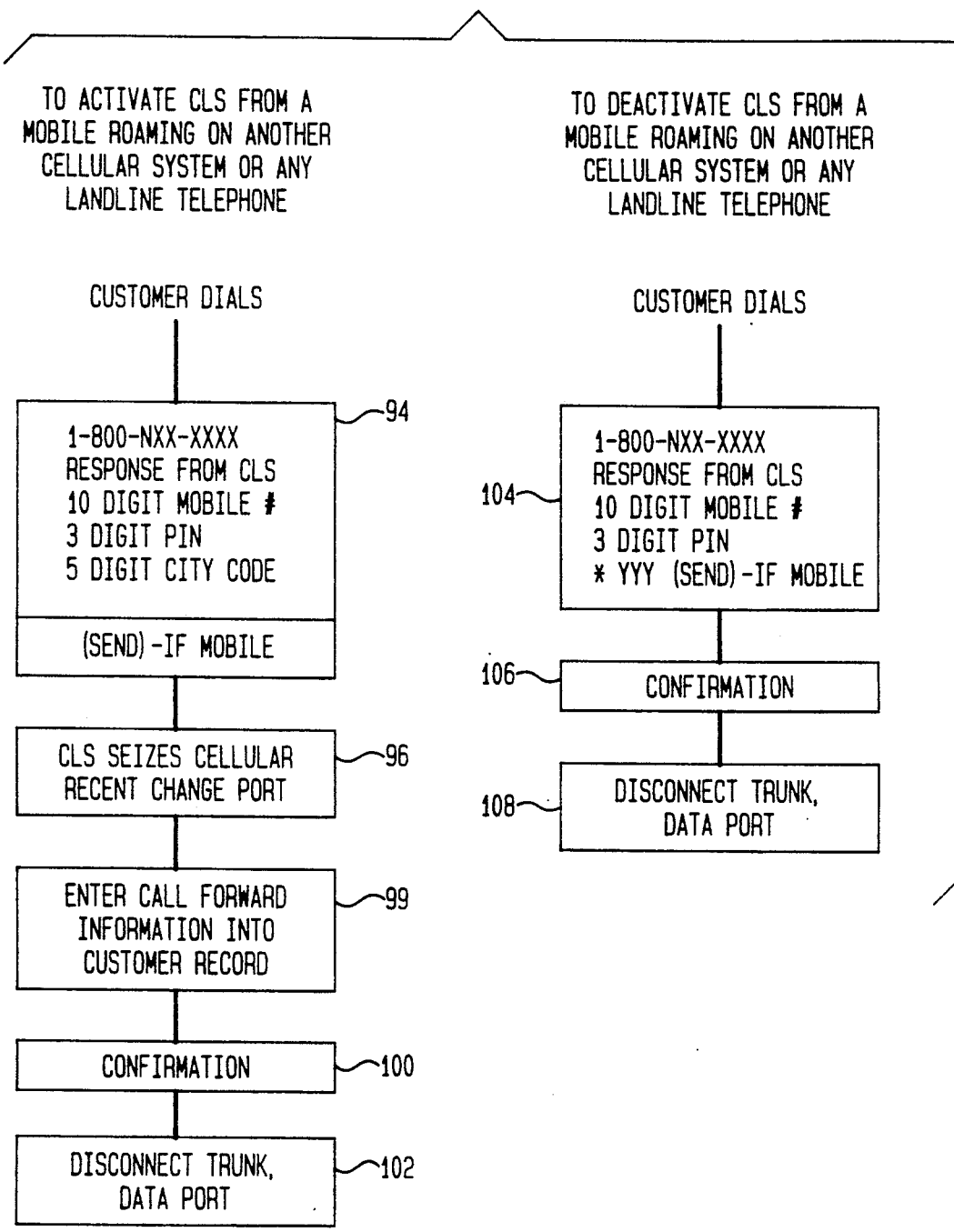
FIG. 5 is a flow diagram of the steps executed by a user to enter or cancel an activation signal for the customer locating system while operating in a remote system, or from any land line telephone connection to the home system.

The use and operation of CLS 10 in conjunction with cellular systems 16, 18 and 20 is illustrated in the flow diagrams of FIGS. 3, 4 and 5. FIG. 4 diagrams the steps for a user of one of the mobile units 26 to enter an activation signal into CLS 10 from the mobile unit while operating within the area covered by the home system 18. The user, as shown in block 90, dials (using DTMF signals) * and a five digit code identifying the city within the area of coverage of remote cellular system 16 or 20 where he or she will be located, and then presses the "send" key on the mobile unit. The signal is received by MTSO 28 and transmitted over trunk 40 to tandem switch 14, and a corresponding signal is transmitted to host computer 12 over high speed data link 15. Host computer 12 enters an activation signal for the mobile unit into its data base, and a signal indicating an activation signal has been entered for the unit also is entered into the data files of MTSO 28. Until the activation signal is cancelled, CLS 10 will attempt to complete calls to the mobile unit through the appropriate remote cellular system 16 or 20.

If the user desires to cancel the activation signal using his or her mobile unit after returning to an area covered by the home system 18, a similar procedure, illustrated in block 92, is followed. The user dials (using DTMF signals) *, a three digit cancellation code and then presses the send key. This signal is received by MTSO 28, and a corresponding signal is transmitted to host computer 12 in the same manner as for effecting entry of the activation signal. The host computer 12 then cancels the activation signal in its data base file for that mobile unit, and the corresponding signal entered into the data files of MTSO 28 also is cancelled.

The steps for entering an activation signal into CLS 10 from a mobile unit 26 while operating within an area covered by remote systems 16 or 20 are diagramed in FIG. 5. In this case, the call to CLS 10 is patched through MTSO 24 or 32 and then over WATS lines 36 to CLS 10. Starting at block 94, the user dials, using DTMF signals, CLS 10 using an "800" number (1-800) and a seven digit number assigned to a WATS line accessing tandem switch 14, and then presses the send key to transfer this signal to tandem switch 14 through the remote system. If desired, a non-800 (toll number) can be used. After receiving a response from CLS 10, the user transmits his or her ten digit mobile telephone number, a three digit personal identification (PIN) number and a five digit code identifying the city in which the mobile unit will be operating temporarily. At block 96, switch 14 establishes communication through update port 42 to host computer 12, and, at block 98, a corresponding activation signal is entered into the data base records of the host computer and a signal corresponding to the activation signal, is entered into the data files of MTSO 28. A confirmation signal is transferred from host computer 12, through switch 14, WATS lines 36 and the remote system 16 or 20, to the mobile unit at block 100. The communication with host computer 12 through update port 42 is disconnected at block 102.

The same steps diagrammed in blocks 94 through 102 are followed for entering an activation signal into CLS 10 for a mobile unit 26 from any land line telephone. The depression of a "send" key is omitted, however. In this case, the signal is transferred over WATS lines 36 to tandem switch 14, and a corresponding signal is then transmitted to host computer 12.

The steps for cancelling an activation signal from a mobile unit while operating within an area covered by remote systems 16 or 20 are diagramed in blocks 104, 106 and 108 of FIG. 5. The user dials CLS 10, using the same 800 number, and then presses the send key. After receiving a response from the CLS, the user enters his or her ten digit mobile telephone number, three digit personal identification (PIN) Number, * and a three digit cancellation code. A confirmation response from the CLS is received at block 106 followed by disconnection of the telephone connection to host computer 12 at block 108. The host computer then cancels the activation signal for the mobile unit on file in its data base. These same steps (omitting the depression of a send key) also apply to canceling the activation signal from any land line telephone.

FIG. 3 is a flow diagram of the steps CLS 10 and MTSO 28 execute in completing a call to a mobile unit 26 associated with cellular system 18. Starting at block 46, MTSO 28 receives a land line call over land line telephone connection 17 for one of the mobile units 26 and pages the mobile unit. If a response is received, the call is completed in the normal manner through radio communication between MTSO 28 and the mobile unit. If no response is received, MTSO 28 at block 48 searches its files for a signal corresponding to an activation signal for the mobile unit. If no corresponding signal is on file, MTSO 28 activates a recording played to the caller indicating that the mobile unit did not respond to the page.

If a corresponding signal is on file, the call is routed over trunk 40 to tandem switch 14 at block 50. The CLS responds that it is ready to receive a DTMF signal at block 52, and, at block 54, a DTMF signal identifying the mobile unit is transmitted to tandem switch 14. A corresponding signal is transmitted to host computer 12 over high speed data link 15. Host computer 12 retrieves the activation signal for the called mobile unit from its data base at block 56 and directs tandem switch 14 to dial the roamer access port of the remote cellular system 16 or 20 identified from the signal at block 58.

Tandem switch 14 establishes access to a WATS line 36, or any telephone connection if a WATS line has not been installed, to the roamer access port of the remote system at block 60 and, at block 62, host computer 12 enters a standard record entry in AMA data storage device 34. After establishing connection to the WATS or trunk line, switch 14 transmits the roamer access number in DTMF format for the remote cellular system at block 64. After receiving a dial tone from the roamer access port of the remote system at block 66, switch 14 transmits in DTMF format the ten digit telephone number of the called mobile unit 26 at block 68, and a voice path is cut through to the remote system 16 or 20 at block 70.

The remote system returns an answer supervision signal, indicating the remote system has answered the call, and takes over control of the call at block 72. An answer entry record is entered into AMA data storage device 34 by host computer 12 at block 74. The remote MTSO 16 or 20 pages the called mobile unit at block 76, and, if no response is received, the remote MTSO plays a recording to this effect to the caller over the voice path. If a response to the page is received, the remote system determines whether the mobile unit is either on another call or idle at block 78, and, if the unit is on another call, a busy signal tone is played to the caller over the voice path. If the unit is idle, the remote system determines whether the unit answers at block 80, and, if it does not answer, a recording to this effect is played to the caller over the voice path. If the mobile unit answers, the conversation occurs over the voice path and through radio communication between the remote MTSO and the mobile unit at block 82. The conversation continues until the caller or user terminates the voice path from his or her telephone station. The remote system then transmits a removal of answer supervision signal, indicating that the remote system has disconnected the call, at block 84, switch 14 releases the WATS or trunk line at block 86 and the host computer 12 enters a disconnect entry into AMA data storage device 34 at block 88.

In view of the forgoing disclosure, numerous variations and combinations of the described apparatus and method for completing telephone calls to mobile telephones will be apparent. The foregoing description of the preferred embodiments, therefore, should be taken as illustrating, rather than limiting, the invention as defined in the following claims.

I claim:

1. A method of completing telephone calls to radio telephones, comprising the steps of:
   entering into a data base of a computer associated with a first radio telephone system an activation signal identifying the radio telephone and identifying a second radio telephone system having a roamer access telephone number, each of said radio telephone systems comprising one or more MTSO's and a plurality of fixed transmitters in radio telephone communication with a plurality of radio telephones through said transmitters and providing radio telephone communication service to radio telephones within different geographic areas;
   searching said data base for said activation signal upon the receipt of a telephone call for said radio telephone;
   switching said telephone call to said second radio telephone system through a telephone connection to the roamer access telephone number of said second radio telephone system; and
   completing said telephone call to said radio telephone through radio communication between said second radio telephone system and said radio telephone.

2. A method according to claim 1, comprising the further step of paging said radio telephone for a response prior to searching said data base.

3. A method according to claim 1, comprising the further step of receiving a coded signal at said first radio telephone system from a user of said radio telephone through telephone communication and entering said activation signal in said data base in response to said receipt.

4. A method according to claim 3, wherein said telephone communication is effected through DTMF telephone signals.

5. A method according to claim 2, wherein said telephone communication is transmitted through said second radio telephone system.

6. A method according to claim 1, comprising the further step of cancelling said activation signal upon receiving at said first radio telephone system a coded signal from a user of said radio telephone through telephone communication.

7. A method according to claim 6, wherein said telephone communication is effected through DTMF telephone signals.

8. A method according to claim 6, wherein said telephone communication is transmitted through said second radio telephone system.

9. A method according to claim 1, wherein said telephone connection to said roamer access telephone number of said second telephone system is a land line telephone connection.

10. A method according to claim 1, comprising the further steps of entering into said data base a second activation signal identifying a second radio telephone associated with said second radio telephone system;
  searching said data base for said second activation signal upon the receipt of a telephone call for said second radio telephone;
  switching said telephone call for said second radio telephone to said first radio telephone system through a telephone connection to a roamer access telephone number of said first radio telephone system; and
  completing said telephone call for said second radio telephone to said second radio telephone through radio communication between said first radio telephone system and said second radio telephone.

11. A method according to claim 1, comprising the further step of receiving at said first radio telephone system a signal registering the presence of said radio telephone within the geographic area covered by said second radio telephone system and entering said activation signal in said data base in response to said receipt.

12. A method according to claim 11, comprising the further step of receiving at said first radio telephone system a signal registering the departure of said radio telephone from the geographic are covered by said second radio telephone system and cancelling said activation signal in response to said receipt.

13. A method according to claim 1, wherein said switching includes transmitting the roamer access telephone number using DTMF signals and said completing includes transmitting the telephone number for said radio telephone using DTMF signals.

14. An apparatus for completing telephone calls to radio telephones, comprising:
  a computer associated with a first radio telephone system to which a radio telephone is associated;
  means for entering into the data base of said computer an activation signal identifying the radio telephone and a second radio telephone system having a roamer access telephone number, each of said radio telephone systems comprising one or more MTSO's and a plurality of fixed transmitters in radio telephone communication with a plurality of radio telephones through said transmitters and providing radio telephone communication service to radio telephones within different geographic areas;
  means for searching said data base for said activation signal upon the receipt of a telephone call for said radio telephone;
  means for switching said telephone call to said second radio telephone system through a telephone connection to the roamer access telephone number of said second radio telephone system; and
  means for completing said telephone call to said radio telephone through radio communication between said second radio telephone system and said radio telephone.

15. An apparatus according to claim 14, further comprising means for paging said radio telephone for a response prior to searching said data base.

16. An apparatus according to claim 14, further comprising means for receiving a coded signal at said first radio telephone system from a user of said radio telephone through telephone communication and for entering said activation signal in said data base in response to said receipt.

17. An apparatus according to claim 16, wherein said means for receiving includes means for receiving said telephone communication through DTMF telephone signals.

18. An apparatus according to claim 16, wherein said means for receiving includes means for receiving said telephone communication transmitted through said second radio telephone system.

19. An apparatus according to claim 14, further comprising means for receiving a coded signal at said first radio telephone system from a user of said radio telephone through telephone communication and for cancelling said activation signal in said data base in response to said receipt.

20. An apparatus according to claim 19, wherein said means for receiving includes means for receiving said telephone communication through DTMF telephone signals.

21. An apparatus according to claim 19, wherein said means for receiving includes means for receiving said telephone communication transmitted through said second radio telephone system.

22. An apparatus according to claim 14, wherein said telephone connection to said roamer access telephone number of said second telephone system is a land line telephone connection.

23. An apparatus according to claim 14, further comprising means for entering into said data base a second activation signal identifying a second radio telephone associated with said second radio telephone system;
  means for searching said data base for said second activation signal upon the receipt of a telephone call for said second radio telephone;
  means for switching said telephone said second radio telephone to said first radio telephone system through a telephone connection to a roamer access telephone number of said first radio telephone system; and
  means for completing said telephone call for said second radio telephone to said second radio telephone through radio communication between said first radio telephone system and said second radio telephone.

24. An apparatus according to claim 14, further comprising means for receiving at said first radio telephone system a signal registering the presence of said radio telephone within the geographic area covered by said second radio telephone system and for entering said activation signal in said data base in response to said receipt.

25. An apparatus according to claim 24, further comprising means for receiving at said first radio telephone system a signal registering the departure of said radio telephone from the geographic area covered by said second radio telephone system and for cancelling said activation signal in response to said receipt.

26. An apparatus according to claim 14, wherein said means for switching includes means for transmitting the roamer access telephone number using DTMF signals and said means for completing includes means for transmitting the telephone number for said radio telephone using DTMF signals.

27. An apparatus for completing telephone calls to radio telephones, comprising:
   a first radio telephone system for receiving telephone calls for radio telephones associated with said system and for completing said calls by radio communication with said radio telephones;
   means for receiving through telephone communication from a user of one of said radio telephones a coded signal for said radio telephones;
   means for directing, after receipt of said coded signal, telephone calls for said radio telephone to a telephone switch associated with said first radio telephone system;
   computer means associated with said telephone switch for identifying, from said coded signal, said radio telephone and for identifying a second radio telephone system having a roamer access telephone number to which said directed telephone calls should be switched, said first and second radio telephone systems each comprising one or more MTSO's and a plurality of fixed transmitters in radio telephone communication with a plurality of radio telephones through said transmitters and providing radio telephone communication service to radio telephones within different geographic areas;
   means for making a telephone connection between said switch and the roamer access telephone number for said second radio telephone system; and
   means for completing said directed telephone calls through said telephone connection and said second radio telephone system using radio communication between said radio telephone and said second radio telephone system.

28. An apparatus according to claim 27, further comprising means for paging said radio telephone for a response before directing said telephone calls to said telephone switch.

29. An apparatus according to claim 27, wherein said means for receiving includes means for receiving said telephone communication from said user transmitted through DTMF telephone signals.

30. An apparatus according to claim 27, wherein said means for receiving includes means for receiving said telephone communication from said user effected through said radio telephone.

31. An apparatus according to claim 27, wherein said means for receiving includes means for receiving said telephone communication from said user transmitted through said second radio telephone system.

32. An apparatus according to claim 27, wherein said means for receiving includes means for receiving through telephone communication from said user a second coded signal for cancelling said activation signal.

33. An apparatus according to claim 32, wherein said second coded signal is a DTMF signal.

34. An apparatus according to claim 32, further comprising means for receiving said second coded signal from said user effected through said radio telephone.

35. An apparatus according to claim 32, further comprising means for receiving said second coded signal transmitted through said second radio telephone system.

36. An apparatus according to claim 27, wherein said telephone connection between said switch and said roamer access telephone number for said second radio telephone system is a land line telephone connection.

37. An apparatus according to claim 27, wherein said means for making includes means for transmitting the roamer access telephone number using DTMF signals and said means for completing includes means for transmitting the telephone number for said radio telephone using DTMF signals.

* * * * *

UNITED STATES PATENT AND TRADEMARK OFFICE
CERTIFICATE OF CORRECTION

PATENT NO. : 5,090,050

DATED : February 18, 1992

INVENTOR(S) : Heffernan

It is certified that error appears in the above-identified patent and that said Letters Patent is hereby corrected as shown below:

Column 1, line 57, "u it" should read --unit--.

Column 4, line 39, "system !8" should read --system 18--.

Column 5, line 16, "cause" should read --causes--.

Column 8, line 58, "claim 2" should read --claim 3--.

Column 9, line 34, "are" should read --area--.

Column 10, line 43, after "telephone" insert --call for--.

Signed and Sealed this

Eighteenth Day of May, 1993

Attest:

MICHAEL K. KIRK

Attesting Officer

Acting Commissioner of Patents and Trademarks